(12) United States Patent
Sie et al.

(10) Patent No.: US 8,020,186 B1
(45) Date of Patent: Sep. 13, 2011

(54) METHODS AND SYSTEMS FOR DISTRIBUTING ON-DEMAND PROGRAMMING

(75) Inventors: John J. Sie, Englewood, CO (US); Gregory R. DePrez, Highlands Ranch, CO (US); John C. Beyler, Highlands Ranch, CO (US); Scott G. Barton, Lone Tree, CO (US)

(73) Assignee: Starz Entertainment, LLC, Englewood, CO (US)

( * ) Notice: Subject to any disclaimer, the term of this patent is extended or adjusted under 35 U.S.C. 154(b) by 1387 days.

(21) Appl. No.: 11/076,450

(22) Filed: Mar. 8, 2005

Related U.S. Application Data

(63) Continuation-in-part of application No. 10/393,724, filed on Mar. 18, 2003, application No. 11/076,450, which is a continuation-in-part of application No. 10/128,653, filed on Apr. 22, 2002, now Pat. No. 7,779,439, application No. 11/076,450, which is a continuation-in-part of application No. 09/687,149, filed on Oct. 12, 2000, now Pat. No. 7,240,359, application No. 11/076,450, which is a continuation-in-part of application No. 09/687,148, filed on Oct. 12, 2000, now Pat. No. 7,228,559.

(60) Provisional application No. 60/551,477, filed on Mar. 8, 2004, provisional application No. 60/368,646, filed on Mar. 29, 2002, provisional application No. 60/285,817, filed on Apr. 23, 2001, provisional application No. 60/159,202, filed on Oct. 13, 1999, provisional application No. 60/159,469, filed on Oct. 13, 1999, provisional application No. 60/163,324, filed on Nov. 3, 1999, provisional application No. 60/159,202, filed on Oct. 13, 1999, provisional application No. 60/159,469, filed on Oct. 13, 1999, provisional application No. 60/163,324, filed on Nov. 3, 1999.

(51) Int. Cl.
*H04N 7/173* (2006.01)
(52) U.S. Cl. ............... 725/87; 725/39; 725/40; 725/52; 725/89; 725/101; 725/102; 725/104
(58) Field of Classification Search ................... 725/40, 725/87, 89, 39, 52, 101, 102, 104
See application file for complete search history.

(56) References Cited

U.S. PATENT DOCUMENTS 5,130,792 A  7/1992  Tindell et al.
(Continued)

FOREIGN PATENT DOCUMENTS

WO  WO 00/59217 A1  10/2000
(Continued)

OTHER PUBLICATIONS

Ciciora, Walter; James Farmer; David Large; *Modern Cable Television Technology: Video, Voice, and Data Communications*; Morgan Kaufmann Publishers, Inc.; 1999; Chapter 16; pp. 659-688.

(Continued)

*Primary Examiner* — William Trost, IV
*Assistant Examiner* — Sumaiya A Chowdhury
(74) *Attorney, Agent, or Firm* — Kilpatrick Townsend & Stockton LLP

(57) ABSTRACT

Methods and systems are provided for distributing programming. A fixed linear programming schedule identifying an order of transmission for multiple programs is generated. The programs are transmitted in the order of transmission. An on-demand flag is embedded in at least one of the programs to identify it as available on an on-demand basis. An electronic program guide for the linear schedule displays the programs available on-demand with an on-demand identifier. The identified programs are then made available on an on-demand basis.

22 Claims, 7 Drawing Sheets

U.S. PATENT DOCUMENTS

| | | | |
|---|---|---|---|
| 5,191,573 A | 3/1993 | Hair | |
| 5,357,276 A | 10/1994 | Banker et al. | |
| 5,530,754 A | 6/1996 | Garfinkle | |
| 5,534,941 A | 7/1996 | Sie et al. | |
| 5,568,181 A | 10/1996 | Greenwood et al. | |
| 5,583,561 A | 12/1996 | Baker et al. | |
| 5,585,838 A | 12/1996 | Lawler et al. | |
| 5,589,892 A | 12/1996 | Knee et al. | |
| 5,604,528 A | 2/1997 | Edwards et al. | |
| 5,610,653 A | 3/1997 | Abecassis | |
| 5,619,247 A | 4/1997 | Russo | |
| 5,619,249 A | 4/1997 | Billock et al. | |
| 5,684,918 A | 11/1997 | Abecassis | |
| 5,701,383 A | 12/1997 | Russo et al. | |
| 5,721,815 A | 2/1998 | Ottesen et al. | |
| 5,724,646 A | 3/1998 | Ganek et al. | |
| 5,774,664 A * | 6/1998 | Hidary et al. | 725/110 |
| 5,790,935 A | 8/1998 | Payton | |
| 5,805,154 A | 9/1998 | Brown | |
| 5,822,530 A | 10/1998 | Brown | |
| 5,850,218 A | 12/1998 | LaJoie et al. | |
| 5,945,988 A | 8/1999 | Williams et al. | |
| 5,973,683 A | 10/1999 | Cragun et al. | |
| 5,977,964 A | 11/1999 | Williams et al. | |
| 5,995,134 A | 11/1999 | Hayashi | |
| 6,005,561 A | 12/1999 | Hawkins et al. | |
| 6,049,333 A | 4/2000 | LaJoie et al. | |
| 6,065,050 A | 5/2000 | DeMoney | |
| RE36,801 E | 8/2000 | Logan et al. | |
| 6,163,272 A | 12/2000 | Goode et al. | |
| 6,163,316 A | 12/2000 | Killian | |
| 6,166,730 A | 12/2000 | Goode et al. | |
| 6,175,378 B1 * | 1/2001 | Maillard | 725/105 |
| 6,177,931 B1 | 1/2001 | Alexander et al. | |
| 6,188,398 B1 | 2/2001 | Collins-Rector et al. | |
| 6,209,024 B1 | 3/2001 | Armstrong et al. | |
| 6,229,895 B1 | 5/2001 | Son et al. | |
| 6,233,389 B1 | 5/2001 | Barton et al. | |
| 6,233,607 B1 | 5/2001 | Taylor et al. | |
| 6,240,553 B1 | 5/2001 | Son et al. | |
| 6,253,375 B1 | 6/2001 | Gordon et al. | |
| 6,266,481 B1 | 7/2001 | Lee et al. | |
| 6,282,207 B1 | 8/2001 | Lerman et al. | |
| 6,305,019 B1 | 10/2001 | Dyer et al. | |
| 6,314,572 B1 * | 11/2001 | LaRocca et al. | 725/60 |
| 6,314,573 B1 | 11/2001 | Gordon et al. | |
| 6,314,575 B1 | 11/2001 | Billock et al. | |
| 6,324,338 B1 | 11/2001 | Wood et al. | |
| 6,486,892 B1 | 11/2002 | Stern | |
| 6,487,722 B1 * | 11/2002 | Okura et al. | 725/40 |
| 6,532,589 B1 | 3/2003 | Proehl et al. | |
| 6,571,390 B1 | 5/2003 | Dunn et al. | |
| 6,601,237 B1 | 7/2003 | Ten Kate et al. | |
| 6,614,987 B1 | 9/2003 | Ismail et al. | |
| 6,637,029 B1 | 10/2003 | Maissel et al. | |
| 6,725,303 B1 | 4/2004 | Hoguta et al. | |
| 6,813,775 B1 | 11/2004 | Finseth et al. | |
| 7,240,359 B1 | 7/2007 | Sie et al. | |
| 2002/0026459 A1 | 2/2002 | Fernandez | |
| 2002/0054752 A1 | 5/2002 | Wood et al. | |
| 2002/0077880 A1 | 6/2002 | Gordon et al. | |
| 2002/0120498 A1 | 8/2002 | Gordon et al. | |
| 2002/0174438 A1 | 11/2002 | Cleary et al. | |
| 2002/0178446 A1 | 11/2002 | Sie et al. | |
| 2003/0001978 A1 * | 1/2003 | Smith et al. | 348/714 |
| 2003/0020744 A1 | 1/2003 | Ellis et al. | |
| 2003/0061610 A1 | 3/2003 | Errico | |
| 2003/0067554 A1 | 4/2003 | Klarfeld et al. | |
| 2003/0088872 A1 | 5/2003 | Maissel et al. | |
| 2003/0101451 A1 | 5/2003 | Bentolila et al. | |
| 2003/0149988 A1 * | 8/2003 | Ellis et al. | 725/87 |
| 2003/0188316 A1 | 10/2003 | DePrez | |
| 2003/0233656 A1 | 12/2003 | Sie et al. | |
| 2004/0117831 A1 | 6/2004 | Ellis et al. | |
| 2004/0172662 A1 * | 9/2004 | Danker et al. | 725/135 |

FOREIGN PATENT DOCUMENTS

| | | | |
|---|---|---|---|
| WO | WO 00/59220 A1 | 10/2000 | |
| WO | WO 00/79798 A1 | 12/2000 | |
| WO | WO 01/52543 A1 | 6/2001 | |

OTHER PUBLICATIONS

Leibowitz, Dennis H. *Cable TV and New Media: Law & Finance*, Media Law Publishing Corp., Apr. 2000, 6 pages, vol. XVIII, No. 1.

Broadband Week.com website printout entitled, "Join over 23,000 key decision-makers in the broadband market every business day . . ." Broadband Week, at http://www.broadbandweek.com/news/020603/print/020603_content_one.htm, Jun. 3, 2002; 3 pages.

* cited by examiner

| | 4:00 | 4:30 | 5:00 | 5:30 | 6:00 | 6:30 | 7:00 | 7:30 | 8:00 | 8:30 | 9:00 |
|---|---|---|---|---|---|---|---|---|---|---|---|
| Ch. A | 350-1 | 350-3 (OD) 356 | | 350-4 | | 350-8 | | | 350-4 | 350-3 (OD) 356 | |
| Ch. B | 350-4 | 350-3 (OD) 356 | | 350-4 (OD) 356 | 350-6 | | 350-9 | | | 350-6 | |
| Ch. C | 350-3 | | 350-3 (OD) 356 | 350-6 | | | 350-6 | | 350-3 | | |
| Ch. D | 350-5 | | | 350-7 | 350-7 (OD) 356 | 350-2 | | 350-7 | 350-7 (OD) 356 | | 350-5 |
| Ch. E | 350-1 | | | 350-6 | | 350-5 | 350-8 | | | | 350-1 |
| Ch. F | 350-3 | | | 350-7 | 356 | | 350-9 | | | 350-3 | 350-3 (OD) 356 |

Fig. 3B

METHODS AND SYSTEMS FOR DISTRIBUTING ON-DEMAND PROGRAMMING

CROSS-REFERENCES TO RELATED APPLICATIONS

This application is a nonprovisional of, and claims the benefit of the filing date of, U.S. Prov. Pat. Appl. No. 60/551,477, entitled "THEMATIC VOD NAVIGATION," filed Mar. 8, 2004 by John J. Sie et al., the entire disclosure of which is incorporated herein by reference for all purposes.

This application is also a continuation-in-part of U.S. patent application Ser. No. 10/393,724, entitled "INSTANT VIDEO ON-DEMAND PLAYBACK," filed Mar. 18, 2003 by Gregory C. DePrez, which is a nonprovisional of U.S. Prov. Pat. Appl. No. 60/368,646, filed Mar. 29, 2002, the entire disclosure of each of which is incorporated herein by reference for all purposes.

This application is also a continuation-in-part of U.S. patent application Ser. No. 10/128,653, entitled "PROGRAM GUIDE ENVIRONMENT," filed Apr. 22, 2002 by John J. Sie et al., which is a nonprovisional of U.S. Prov. Pat. Appl. No. 60/285,817, entitled "PROGRAM GUIDE ENHANCEMENTS," filed Apr. 23, 2001 by John J. Sie and John C. Beyler, the entire disclosure of each of which are incorporated herein by reference for all purposes.

This application is also a continuation-in-part of U.S. patent application Ser. No. 09/687,149, entitled "PROGRAMMING DISTRIBUTION SYSTEM," filed Oct. 12, 2000 by John J. Sie et al., which is a nonprovisional of each of U.S. Prov. Pat. Appl. No. 60/159,202, filed Oct. 13, 1999, U.S. Prov. Pat. Appl. No. 60/159,469, filed Oct. 13, 1999, and U.S. Prov. Pat. Appl. No. 60/163,324, filed Nov. 3, 1999, the entire disclosure of each of which is incorporated herein by reference for all purposes.

This application is also a continuation-in-part of U.S. patent application Ser. No. 09/687,148, entitled "PROGRAMMING DISTRIBUTION AND NOTIFICATION SYSTEM," filed Oct. 12, 2000 by John J. Sie et al., which is a nonprovisional of each of U.S. Prov. Pat. Appl. No. 60/159,202, filed Oct. 13, 1999, U.S. Prov. Pat. Appl. No. 60/159,469, filed Oct. 13, 1999, and U.S. Prov. Pat. Appl. No. 60/163,324, filed Nov. 3, 1999, the entire disclosure of each of which is incorporated herein by reference for all purposes.

This application is also related to U.S. Prov. Pat. Appl. No. 60/159,202, entitled "SUBSCRIPTION VIDEO ON-DEMAND," filed Oct. 13, 1999 by John J. Sie et al., and to U.S. patent application Ser. No. 11/075,630, entitled "THEMATIC VOD NAVIGATION," filed Mar. 8, 2005 by John J. Sie et al., the entire disclosure of each of which is incorporated herein by reference for all purposes.

BACKGROUND OF THE INVENTION

This application relates generally to content delivery. More specifically, this application relates to methods and systems for distributing on-demand programming.

There are a number of methods of delivering content to customers. Some such methods deliver the programming directly to an individual business or residence by using satellite, microwave, UHF, VHF, or cable to a set-top box of a user. Most content is available according to linear schedules published in programming guides. Certain additional services are available with some of these delivery systems, such as pay-per-view ("PPV"), video-on-demand ("VOD"), near-video-on-demand ("NVOD"), and subscription video-on-demand ("SVOD"). A PPV service allows a user to purchase the right to play a program according to a linear schedule. A VOD service provides a user with the ability to access a program stream at any desired time. A NVOD service is a hybrid service where a program is available on a number of different channels in a linear program with staggered start times. A SVOD service provides a set of programs that are available for access at any desired time in accordance with a subscription agreement. As used herein, each of these services is an example of a service that provides "on-demand" programming. In some cases, the set of programming that is made available on-demand may be a subset of programs that are transmitted according to a linear program schedule.

BRIEF SUMMARY OF THE INVENTION

Embodiments of the invention provide methods and systems for distributing programming. A fixed linear programming schedule identifying an order of transmission for a plurality of programs is generated. The programs are transmitted in the order of transmission. An on-demand flag is embedded in at least one of the plurality of programs to identify the at least one of the plurality of programs as available on an on-demand basis. The at least one of the plurality of programs is then made available on an on-demand basis.

Examples of programs that may be distributed include video programs. In some embodiments, the programming schedule further identifies a time of transmission for each of the plurality of programs. The programs may be made available on an on-demand basis by making them available on a pay-per-view basis. In other instances, the programs may be made available on an on-demand basis as part of a subscription that provides on-demand access to a plurality of subscription programs, with the at least one of the plurality of programs transmitted in a linear schedule having a substantially identical counterpart among the plurality of subscription programs.

In one embodiment, a program guide is generated for display. The program guide summarizes at least a portion of the fixed linear programming schedule and includes an on-demand identifier identifying the at least one of the plurality of programs as available on an on-demand bases; the on-demand identifier is generated according to a presence of the on-demand flag embedded in the at least one of the plurality of programs. The at least one of the plurality of programs may be made available in a plurality of on-demand formats, with the program guide further identifying the plurality of on-demand formats. The at least one of the plurality of programs may be made available in a plurality of languages, with the program guide further identifying the plurality of languages. Supplementary material related to the at least one of the plurality of programs may also be made available on an on-demand basis, with the program guide further identifying the supplementary material available. In embodiments where options for selection of different versions of the at least one of the plurality of programs are provided, the program guide may further include a selection icon identified to correspond to a specific version among the different versions in accordance with a previously specified default selection of options.

The programs may be transmitted over a public network like the Internet, over a broadcast satellite network, over a cable television network, over a wireless network, over a fiber-optic network, or over VDSL in different embodiments.

The methods of the invention may also be embodied in a system for distributing programming that comprises a transmission system, a storage device, and a communications device. The storage device and communications device are both in communication with the transmission system. The transmission system further comprises a computer-readable storage medium having a computer-readable program embodied therein for direction operation of the transmission system in accordance with the embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

FIGS. 3A and 3B provide illustrations of different structures for program guides that may be used in exemplary embodiments of the invention.

DETAILED DESCRIPTION OF THE INVENTION

Figure 1A:
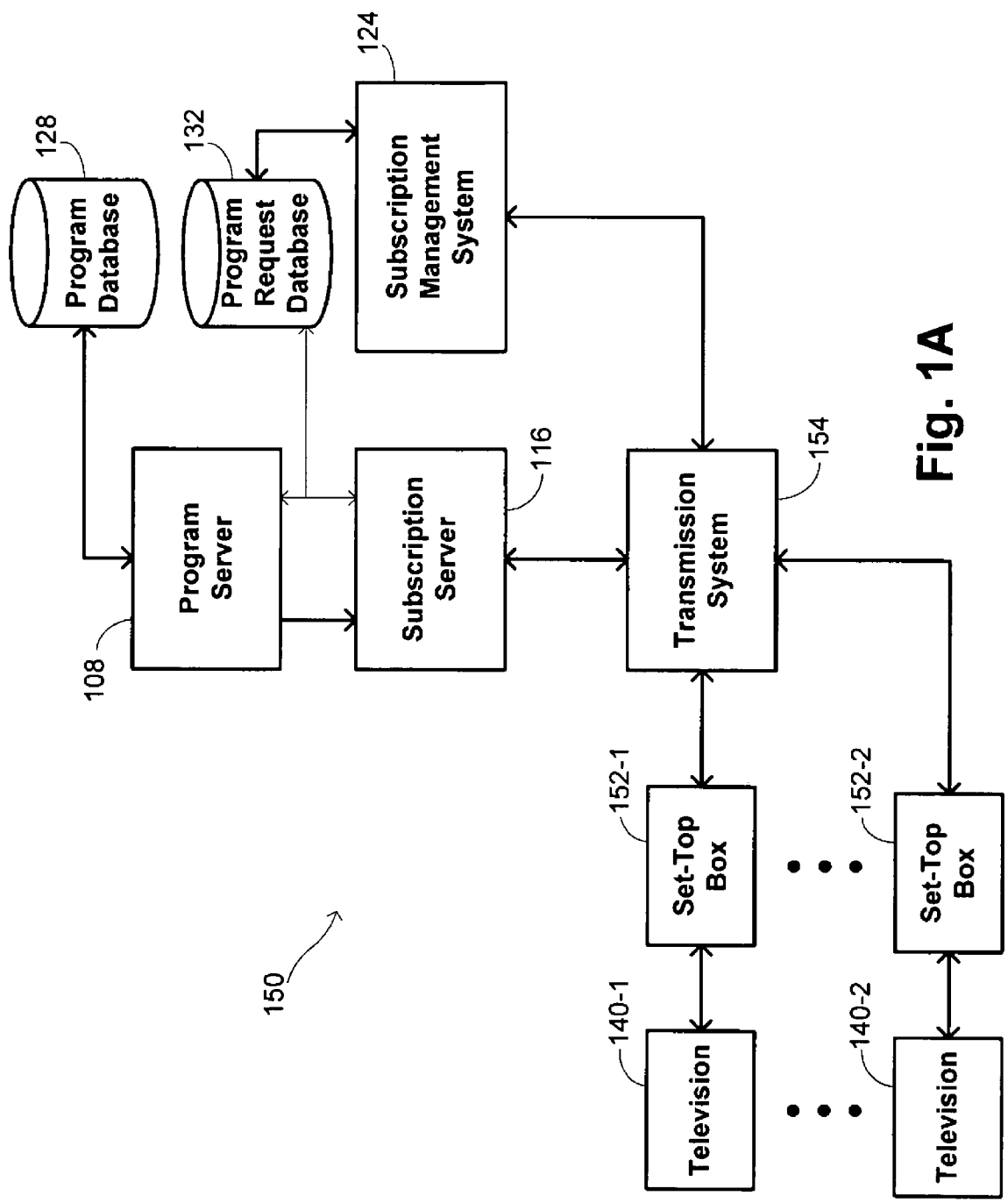
FIGS. 1A-1D provide schematic illustrations of different embodiments of programming distribution systems that may be used in embodiments of the invention.

Embodiments of the invention provide methods and systems for distributing on-demand programs that permit easy identification by customers of those programs that are available on an on-demand basis. As used herein an "on-demand" program is any program that may retrieved according to a programming model that makes programs available to customers within narrow time windows defined by a customer or that is made available in response to an affirmative request by a customer. For instance, VOD is one type of on-demand programming model that makes programs available to customers substantially at the time the customers desire to view the programs. This is also generally true for an SVOD programming model, which may have certain additional features related to its subscription nature. A NVOD programming model is similarly an example of on-demand programming because programs are made available within a narrow time period, such as at every half hour period. A PPV programming model is considered herein to be an example of on-demand programming because access to programs is provided only in response to an affirmative request for access by a customer.

References to "programs" herein is also intended to be construed broadly to refer to any temporal sequence of content. Thus, while many of the examples described herein refer to video programs, such as movies or television shows, such references are not intended to be limiting. Examples of other types of programs include audio programs, games, and other content sequences.

One feature that may be included with on-demand programming is the ability to provide a customer with "program control" over a demanded program. This is more commonly a feature of VOD and SVOD programming models than with NVOD or PPV programming models, although there is no a priori restriction that would necessarily prevent program control with such other programming models. As used herein "program control" is intended to refer to the ability of the customer to manipulate progression of the demanded program by executing commands that cause a deviation from its normal linear progression. Example of program-control commands thus include such commands as "rewind," "fast-forward," "pause," different speeds for fast-forward and rewind, frame-by-frame advancement of the program, chapter-by-chapter advancement of the program, and the like.

Each of the on-demand programming models may also include linear programming in which a set of programs is transmitted according to a defined time schedule. Embodiments of the invention include a number of different relationships between the programs that are transmitted according to the defined time schedule and the programs that are available on-demand. For instance, the programs available on-demand may be a subset of the programs transmitted according to a defined time schedule. Such an arrangement may conveniently be implemented with an SVOD programming model, although it may be implemented with other on-demand programming models also. For example, payment of a subscription fee could entitle a customer to have access to the subset of programs on an on-demand basis while nonsubscribers are limited to viewing them according to the fixed programming schedule. In other embodiments, there may be some overlap between the programs made available on-demand, but with certain additional programs being provided on an on-demand basis without being transmitted according to the fixed schedule. Such arrangements may be useful in providing bonus material that complements the fixed-schedule programming. For instance, some of the additional on-demand programs might be linked conceptually with programs provided on the fixed schedule, such as when a movie is transmitted on the fixed schedule and both it and documentaries about the making of the movie and providing interviews with the director and actors are provided on-demand.

Distribution of the programming may be accomplished in a number of different ways in different embodiments. Some of these are described explicitly in connection with FIGS. 1A-1D, but the invention is not limited to specific distribution channels. FIG. 1A shows a structure that may be used to provide access to programs to customers through their television sets using a cable-distribution system. The structure shown in FIG. 1A is intended to illustrate the basic structure of the system, which may be integrated with other distribution mechanisms as described further below.

The programming distribution system 150 includes a subscription server 116, a program server 108, and a subscription management system 124. Program information is stored in a program database 128 and program-request information is stored in a program-request database 132. Customers interface with the system using set-top boxes 152 connected with their televisions 140 and provided in communication with a transmission system 154 that coordinates exchange of information with the subscription server 116 and with the subscription management system 124. The transmission system 154 typically multiplexes various programs onto a conduit coupled to the set-top boxes 152 at various customer locations.

The subscription management system 124 coordinates overall management of customer subscriptions to the downloading service. In addition, interactive screens for selecting services are formulated by the subscription management system 124. The screens allow the customer to select additional products or services. The subscription server 116 stores content that is provided for distribution through the transmission system 154. For example, programs may be stored in compressed digital form, such as by using MPEG-2 or MPEG-4 compression.

The program-request database 132 may store customer-specific information and programming information. The customer-specific information includes such information as name, address, membership history, available credit, and the like, as well as a history of programs that have been provided on a demand basis for each customer, specifying each program, when it was provided, etc. Programming information includes such information as schedules for linear-schedule transmission of certain programs, program descriptions, upcoming specials, and the like. In addition, the program-request database 132 may store parental control information that restricts the type of programs that may be provided on an on-demand basis according to content classifications and customer specifications.

Both the program server 108 and subscription management system 124 may interact with the program-request database 132. For example, the program server 108 may provide information to the program-request database 132 when programming is downloaded to manage compliance with subscription requirements and to provide information that may be used for customer billing and the like. The subscription management system 124 may use information stored on the program-request database 132 for accounting purposes and for formulating menu screens presented to the user. For example, a customer might wish to know his account balance or to review a history of programs that have previously been provided on an on-demand basis. This usage information is stored in the program-request database 132 and used by the subscription management system 124 in administering the system.

Typically, multiplexing techniques are used to transmit the various program streams received by the transmission system 154 onto a single coaxial cable, an optical fiber, or a combination thereof. The transmission system 154 may include analog-to-digital converters, digital compression hardware, multiplexers, and other components to make best use of available bandwidth. The subscription management system 124 controls the transmission system 154 to route the appropriate program streams to the desired set-top box 152 of the customer. Although not shown in FIG. 1A, one or more nodes may be interposed between the transmission system 154 and each set-top box 152, as is well known in the art.

On-demand programs that are made available using the system 150 shown in FIG. 1A may permit customers, in some embodiments, to have program control over the on-demand programs. That is, after a customer demands and receives access to the program, he or she is able to manipulate progression of the program in such embodiments using such commands as "rewind," "fast-forward," "pause," and the like.

Figure 1B:
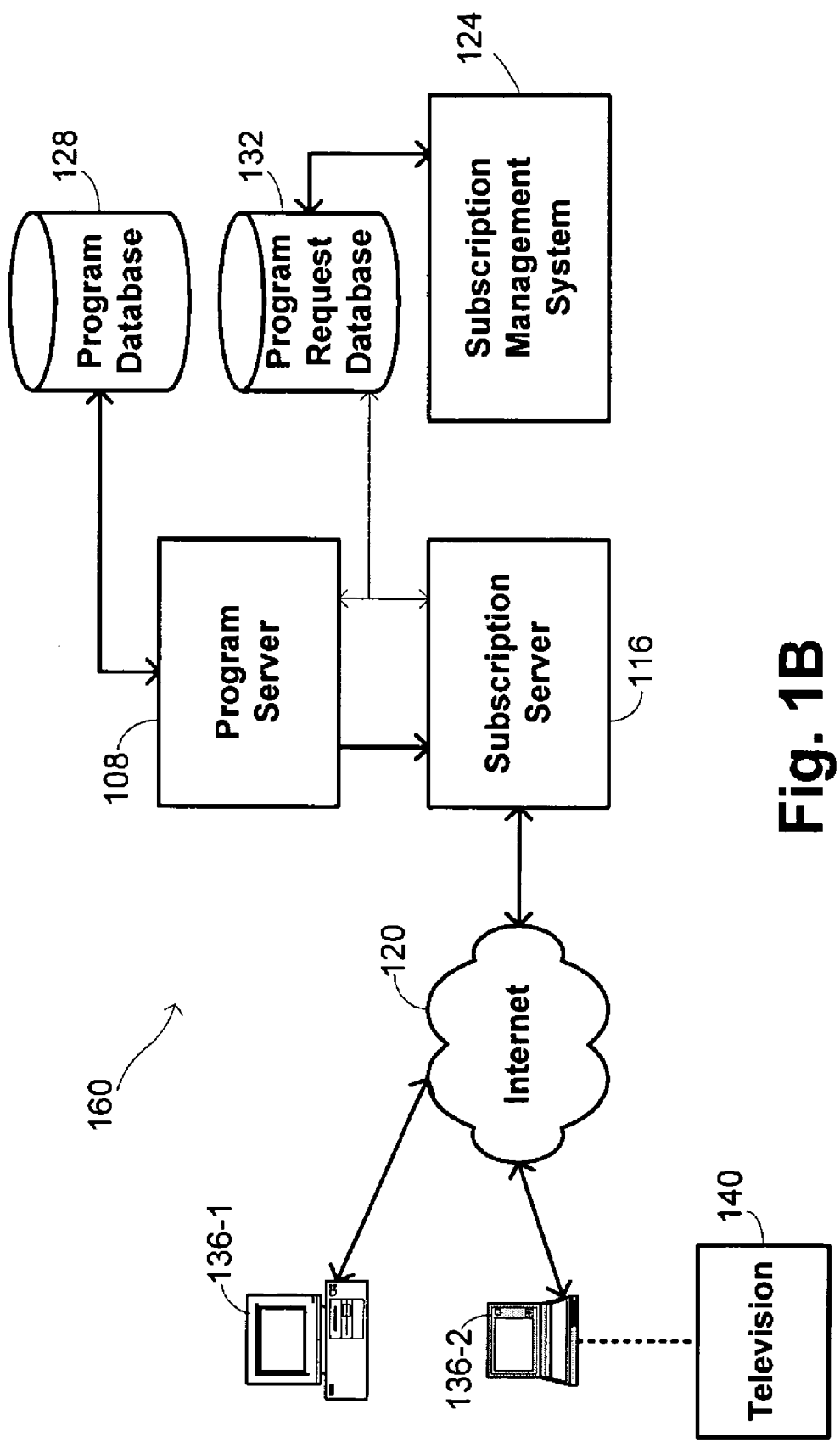

In other embodiments, access to on-demand programming may be provided over a public network such as the Internet. Such an embodiment is illustrated in FIG. 1B for system 160, with the subscription server 116 being interfaced with the Internet 120 and the program server. Customers interface with the system using computers 136 interfaced with the public network 120. The customer computers 136 may comprise a desktop computer 136-1 or a portable computer 136-2 such as a laptop, with the portability provided by the portable computer 136-2 conveniently permitting downloaded content to be moved to different locations. Content may alternatively be downloaded to a variety of other mobile and portable devices, such as handheld devices, mobile telephones, personal video players, and the like.

Once a program has been downloaded to a customer computer 136, the customer may generally play the program using software loaded onto the computer 136 without maintaining an active connection with the public network 120. One example of commercially available software that may be used for program playback is RealPlayer®, although any suitable commercial or proprietary software may be used. In this way, the customer may also by provided with program control over the on-demand programming. In the basic arrangement shown in FIG. 1B, no mechanism is provided for direct transmission by the system to a customer television 140, such as might be desired to view the program on a larger screen. A customer may, however, provide a connection between the computer 136 on which the program has been downloaded and the television 140 on which he wishes to view it. Suitably connections include Standard (Composite) Video Output and Audio Output, S-Video (Y/C) Output, and Digital Visual Interface ("DVI") Output.

Although the program-request database 132 is separate from the subscription management system 124 in the embodiments described in connection with FIGS. 1A and 1B, the functionality of those components may be combined in other alternative embodiments. In particular, both customer-specific and programming information could be provided to the subscriber management system 124 for administration from there with appropriate hardware and software.

Figure 1C:
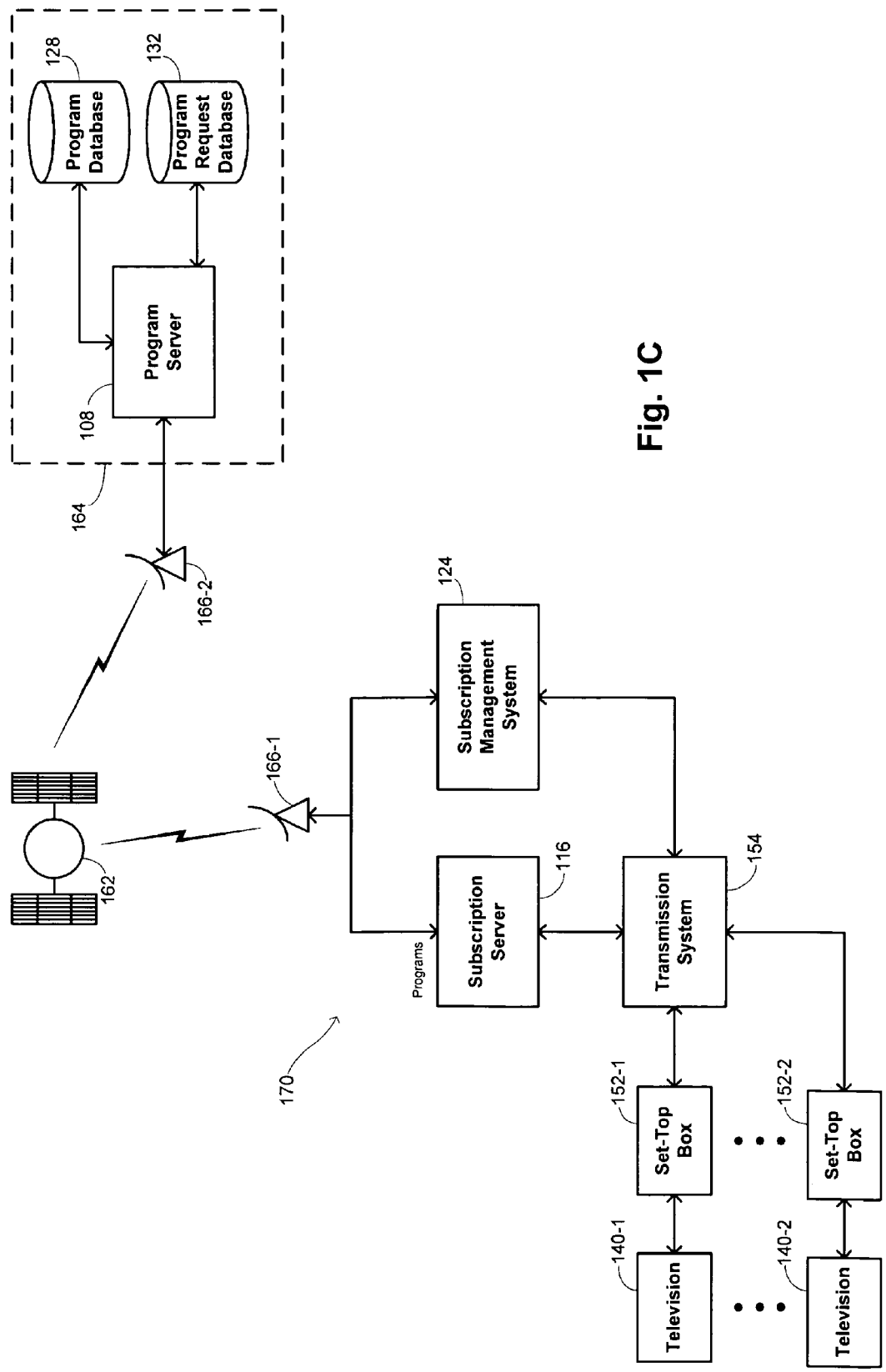

In other instances, the program server 108 may be part of a system of an additional content provider. In some such cases, the additional content provider system may be separated from the on-demand access system. Such an embodiment is illustrated in FIG. 1C, with the additional content provider system denoted by reference number 164 and transmission be effected by a satellite-broadcast arrangement. Such an arrangement permits the additional content provider to have a central location that could communicate with a number of downloading system providers located in remote geographical locations. First and second satellite dishes 166-1 and 166-2 communicate through a satellite 162, which provides bidirectional communication that permits the subscriber management system 124 to interact with the program server 108 and program-request database 132. The satellite communications permit the program server 108 to deliver programming to the subscription server 116 so that the programming may be downloaded over the public network 120 as described in connection with FIG. 1B or delivered to the transmission system 154 for display over a television 140 through a set-top box 152 as described in connection with FIG. 1A.

Figure 1D:
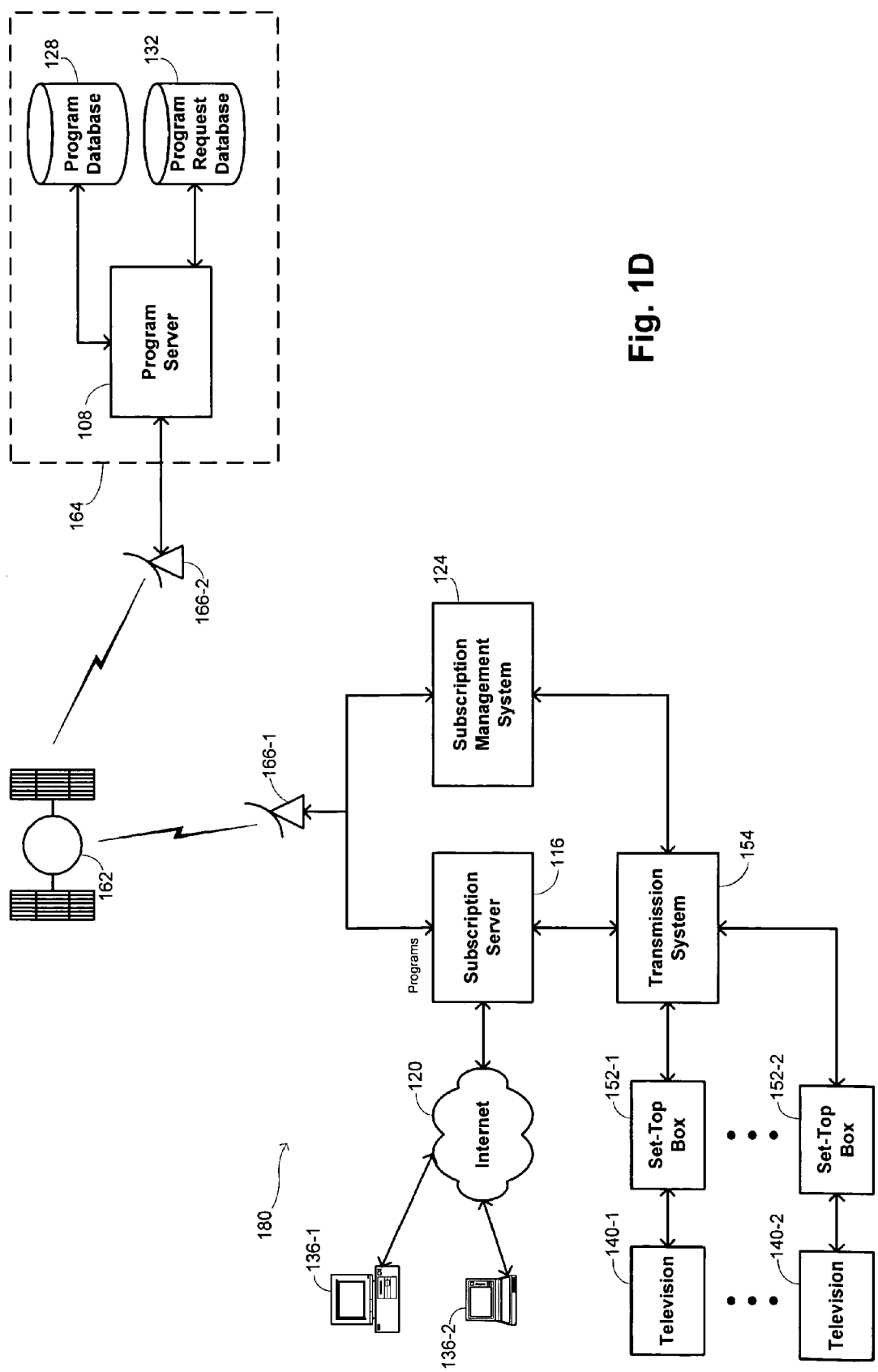

Furthermore, some embodiments may integrate the public-network arrangement of FIG. 1B with the transmission-system arrangement of FIG. 1A by providing the subscription server 116 in communication with both a public network 120 and a transmission system 154. An example of such an embodiment is illustrated in FIG. 1D, with first and second satellite dishes 166-1 and 166-2 again being provided to communicate through a satellite 162 to provide bidirectional communication between the subscription management system 124 and the program server 108.

The systems described above may be used to provide on-demand content to customers. In many instances, it is desirable to provide a convenient mechanism for customers to identify what content is available on an on-demand basis, particularly in those embodiments where systems may be used to provide content according to a fixed linear schedule, with some of that content also being made available on-demand. Customers may acquire information about which programs are available on an on-demand basis from a number of different sources, perhaps the most common of which is a program guide setting forth a list of available and/or upcoming programming. Embodiments of the invention use a flag embedded in copies of transmitted linear broadcast programs that are also available on-demand so that generation of program guides or other sources of information about available programs will automatically identify the on-demand programs. Such an automated process may be used in lieu of other processes to manage a continuous exchange of data between on-demand servers and program guides or other sources of programming information.

Figure 2:
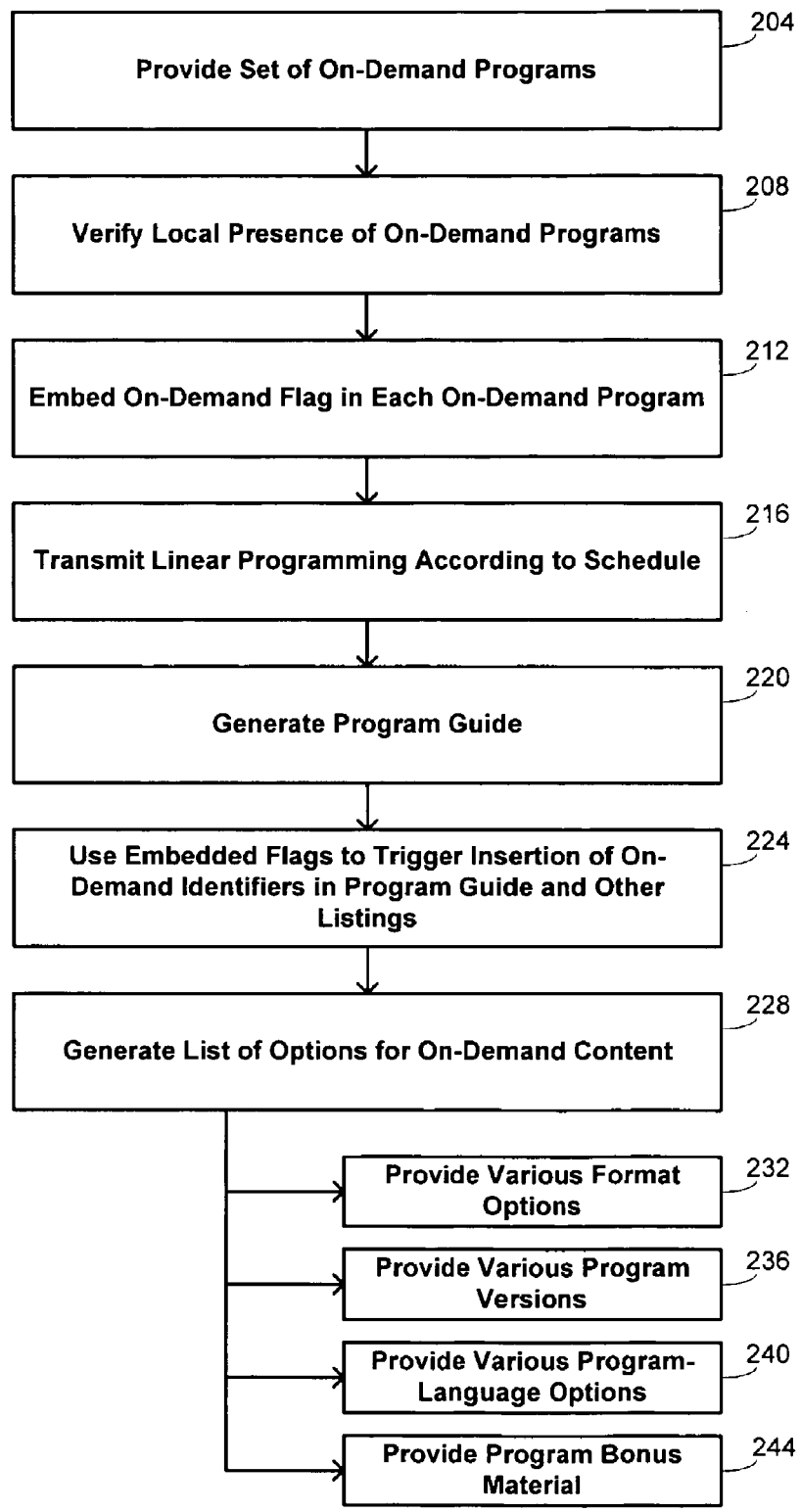
FIG. 2 is a flow diagram that illustrates methods for distributing programming in accordance with embodiments of the invention.

An overview of this process is provided in FIG. 2. At block 204, a set of on-demand programs is provided. This may be done, for instance, by transmitting copies of the on-demand programs to the program database 128 in FIGS. 1A-1D described above. Delivery of the programs to the program database 128 may depend on negotiations with program suppliers, transmission routes, and other factors. In particular, it may sometimes be the case that multiple program databases 128 are distributed in different geographical areas, with programs being delivered to some geographical areas and being available for on-demand delivery to customers, while delivery to other geographical areas is unsuccessful. To account for the possibility that these various factors may result in certain programs not being available at some locations, a check may be made at block 208 to confirm the presence of an on-demand program at a particular program database 128.

Each on-demand program delivered to the program database 128 is embedded with an on-demand flag, as indicated at block 212. Linear programming is transmitted according to fixed schedule at block 216 and includes at least some programs available on-demand. At block 220, a program guide is generated by collecting information about when the linearly scheduled programming is to be transmitted. The presence of the on-demand flag in some programs triggers the insertion of an on-demand identifier throughout the program listings, as indicated at block 224. A similar process is triggered wherever identifications of the programs appear so that there is a consistent identification of the on-demand identifier. For example, in some embodiments, an identifier may be generated for display during transmission of programs according to the linear program schedule and is capable of being activated to initiate on-demand viewing of the program.

As part of the generation of the program guide, a list of options for on-demand content may be generated at block 228. Such options may be varied and may depend on the content of the programs as delivered to the program database 128. For example, a program that is available on-demand may be available in a variety of different on-demand mechanisms or formats, as indicated at block 232. For instance, the on-demand program might be available as a pay-per-view program, might be available as part of a SVOD or NVOD program, or might be available as a straight VOD offering. These various format options may be included within the program guide or, more usually, will be include as options that are identified by activating a link for the format options. Similarly, as indicated at block 236, the options may include different program versions when they are available. For instance, a movie that is provided as an on-demand program may be made available as the theatrically released version or might be made available as a director's-cut version. The generated program guide may include an identification of such options or may include a link that may be activated to retrieve the various options. Other options that may be provided include various program-language options as indicated at block 240. Such options may be provided when the on-demand program is available in English, Spanish, French, and perhaps other languages, and may additionally include options for different-language subtitles if the customer wishes to have the audio portion of the program in its original language. These options too may be identified in the program guide directly or through a link specifying the options. Block 244 indicates that further options may include certain program bonus material, such as supplementary programs providing interviews with a director and/or actors, supplementary programs explaining how certain special effects were introduced into the on-demand program, and the like. These options may also be provided directly as part of the program guide or made available as a result of activating a link.

With these various options included through the program guide, either directly as part of the program guide or through the activation of links on the program guide, the program guide acts as a menu that summarizes the various options available for on-demand programming. In some embodiments, pricing information is additionally made part of this menu. Examples of formatting structures that may be used in presenting the program guide when equipped with these options as derived from the inclusion of the on-demand flags in the on-demand programs are provided in FIGS. 3A and 3B.

Figure 3A:
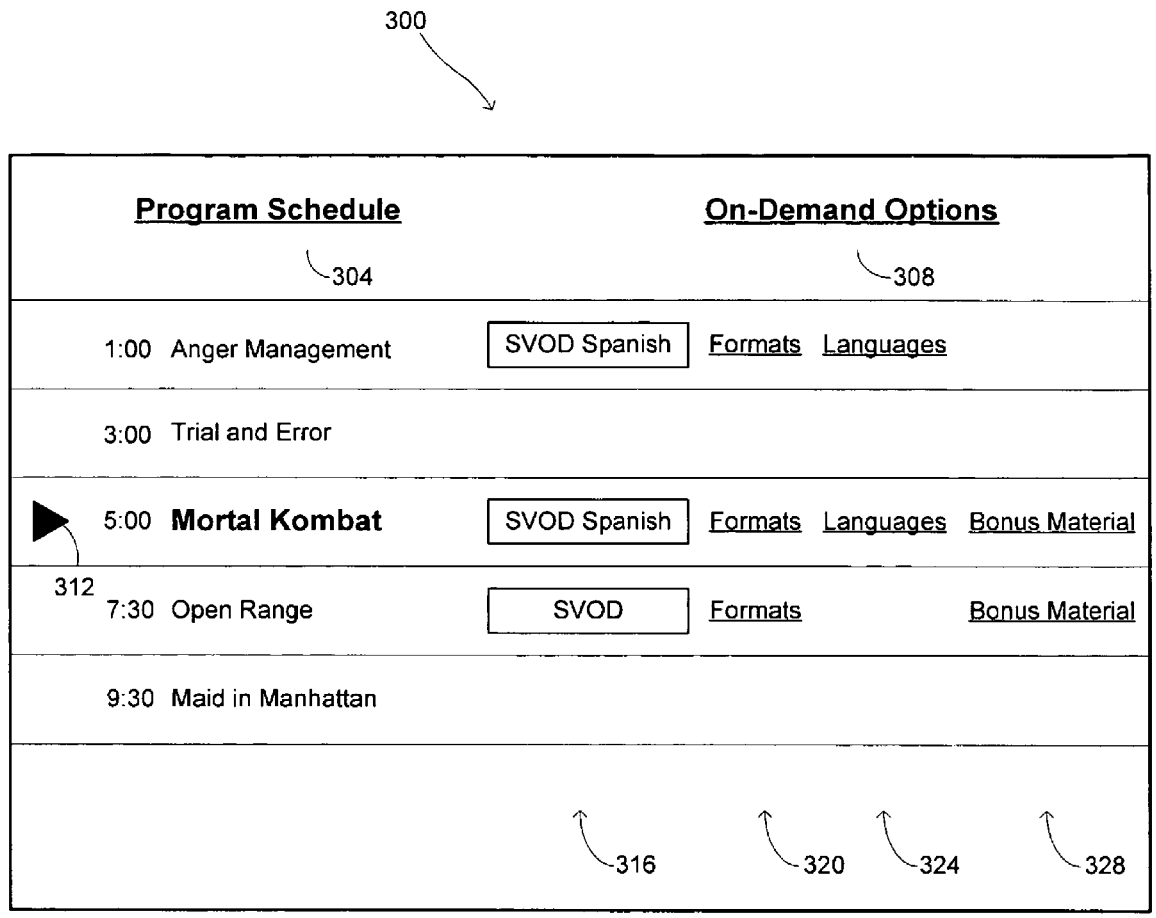

The program guide illustrated in FIG. 3A is arranged to show a list of programs in the order in which they are to appear in the fixed linear program schedule. The program guide is designated generally by reference number 300 and the ordered list of programs according to the fixed schedule is provided in column 304. In one embodiment, the program that is currently being transmitted according to that schedule is distinguished from the other programs, such as by highlighting it in bold and/or larger type, including an arrow marker 312, or by using some other distinguishing characteristics. Programs that appear before or after the current program may be displayed in a common, less distinctive type.

The various on-demand options are identified in a second column, and may include links for different formats 320, links for different languages 324, links for bonus material 328, and perhaps other links for still further options. Activation of any of these links will provide a display of the options that are available for that particular program so that the user may select desired options and initate on-demand playback of the designated program.

In some embodiments, a selection box 316 may be provided that identifies the current option choices so that activation of the selection box 316 initiates the on-demand request. In one embodiment, the selection box 316 may be prepopulated with a default set of options that the user has specified as being most commonly desired. In such instances, the system will match the available selections as closely as possible with the default specification.

Thus, in the example shown in FIG. 3A, the program that is currently being transmitted according to the fixed linear program schedule is "Mortal Kombat." The embedded on-demand flag in that program identifies it as being available as an on-demand program, so that the program guide 300 identifies on-demand options for it. In this instance, there are a number of potential options, including different on-demand formats 320 like SVOD, PPV, etc., different languages 324, such as English, Spanish, etc., and different types of Bonus Material 328. The user has previously specified default options to request that the on-demand offering be an SVOD offering in Spanish when available. Accordingly, the selection box 316 is prepopulated with this choice.

In the example shown in FIG. 3A, two programs had previously been transmitted on the fixed linear schedule before "Mortal Kombat," of which one ("Anger Management") is available as an on-demand offering and one ("Trial and Error") is not. While Anger Management is offered in different formats 320 and languages 324, there is no bonus material that may be selected so the population of the program guide does not include this option. As before, the population of this information results automatically from the presence of the on-demand flag embedded in the program. The user's default choice of SVOD and Spanish is again indicated in the corresponding selection box 316.

In FIG. 3A, two programs will be transmitted on the fixed linear schedule after "Mortal Kombat," one of which ("Open Range") is available as an on-demand offering and one of which ("Maid in Manhattan") is not. In this instance, "Open Range" includes bonus material and is available in different formats, but is not available in a choice of languages. This is evident from the absence of a languages link and by the specification only of the SVOD choice in the prepopulated selection box—this box does not include a specification of the user's preferred Spanish-language choice because it is not available in that language.

In some embodiments, on-demand programming may be made available on a plurality of distinct delivery streams, such as on different channels when a structure like that shown in FIG. 1A is used or on different URLs when a structure like that shown in FIG. 1B is used. A program guide that provides information about multiple channels may be structured more compactly than that shown in FIG. 3A. For example, FIG. 3B provides an illustration of a program-guide that provides information about programs being broadcast according to linear schedules on a plurality of delivery streams, identified as Channels A-F in FIG. 3B. In this example, the fixed schedule of programs 350 includes nine distinct programs 350-1-350-9 that are repeated and staggered among various of the channels at times ranging from 4:00 to 9:00. Of the nine distinct programs, three are identified as available on-demand: 350-3, 350-4, and 350-7 by an on-demand icon 356. Again, the generation of these icons is a result of the presence of an embedded on-demand flag in the respective programs. These icons may be active icons, which pull up additional option information like that described in connection with FIG. 3A when activated. In this way, the user may still be able to select among the various options provided, including program format options, language options, bonus-material options, and the like, even with the more compact arrangement of the program-guide illustrated in FIG. 3B, and initiate viewing of the on-demand program with the option selected.

The multiple-delivery-stream configurations may also permit cross-channel implementations. For example, a service provider who provides customer access to multiple independent channels may monitor the program offerings for each of the independent channels. This permits the service provider to offer cross-channel information in some embodiments. For instance, some programs might be available on a first channel only as part of a fixed linear program schedule without links to on-demand versions, while a second channel might provide on-demand versions of the programs. The flag embedded in the program for one such channel may generate an identification of its on-demand capability while the absence of a similar flag in the same program for the other channel corresponds to the lack of such capability. The desirability of such cross-channel implementations may clearly depend on the interests of the service provider, i.e. on whether the service provider has an interest in promoting all the channels or only some of the channels, and which channels the service provider has an interest in promoting.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method for distributing a plurality of programs, the method comprising:
generating, at a content provider, a fixed linear programming schedule identifying an order of transmission for a plurality of linearly scheduled programs, at least one of the linearly scheduled programs corresponding with an on-demand program offered by the content provider;
transmitting the programs from the content provider in the order of transmission;
embedding an on-demand flag in the at least one of the linearly scheduled programs at the content provider to identify the at least one of the linearly scheduled programs as corresponding with the on-demand program offered by the content provider, the embedded on-demand flag being configured to trigger display of a first on-demand identifier while the at least one of the linearly scheduled programs is being displayed;
making the on-demand program offered by the content provider available on an on-demand basis; and
generating a program guide for display, the program guide summarizing at least a portion of the fixed linear programming schedule and including a second on-demand identifier identifying the at least one of the linearly scheduled programs as corresponding with the on-demand program, the second on-demand identifier being generated according to a presence of the on-demand flag embedded in the at least one of the linearly scheduled programs.

2. The method recited in claim 1 wherein the programming schedule further identifies a time of transmission for each of the plurality of programs.

3. The method recited in claim 1 wherein making the on-demand program available on an on-demand basis comprises making the on-demand program available on a pay-per-view basis.

4. The method recited in claim 1 wherein making the on-demand program available on an on-demand basis comprises making the on-demand program available as part of a subscription that provides on-demand access to at least the on-demand program, the on-demand program being a substantially identical counterpart to the at least one of the linearly scheduled programs corresponding with the on-demand program.

5. The method recited in claim 1 wherein the plurality of programs comprise a plurality of video programs.

6. The method recited in claim 1 wherein:
making the on-demand program available on an on-demand basis comprises making the on-demand program available in a plurality of on-demand formats; and
the program guide further identifies the plurality of on-demand formats available.

7. The method recited in claim 1 wherein:
making the on-demand program available on an on-demand basis comprises making the on-demand program available in a plurality of languages; and
the program guide further identifies the plurality of languages available.

8. The method recited in claim 1 wherein:
making the on-demand program available on an on-demand basis comprises making supplementary material related to the on-demand program available on an on-demand basis; and
the program guide further identifies the supplementary material available.

9. The method recited in claim 1 wherein:
    making the on-demand program available on an on-demand basis comprises providing options for selection of different versions of the on-demand program; and
    the program guide further includes a selection icon identified to correspond to a specific version among the different versions in accordance with a previously specified default selection of options.

10. The method recited in claim 1 wherein transmitting the programs comprises transmitting the programs over a public network.

11. The method recited in claim 10 wherein the public network is the Internet.

12. The method recited in claim 1 wherein transmitting the programs comprises transmitting the programs over a cable network or broadcast satellite network.

13. The method recited in claim 1 wherein the on-demand program comprises supplemental content relating to the at least one of the linearly scheduled programs corresponding with the on-demand program.

14. The method recited in claim 1 wherein the first on-demand identifier is configured to be activated to initiate viewing of the on-demand program, the method further comprising:
    detecting activation of the first on-demand identifier; and
    in response to detecting the activation, transmitting the on-demand program from the content provider.

15. A method for distributing a plurality of video programs, the method comprising:
    generating, at a content provider, a fixed linear programming schedule identifying an order of transmission for a plurality of linearly scheduled video programs, at least one of the linearly scheduled video programs corresponding with an on-demand program;
    transmitting the programs in the order of transmission;
    embedding an on-demand flag in the at least one of the linearly scheduled video programs at the content provider to identify the at least one of the linearly scheduled video programs as corresponding with the on-demand program, the embedded on-demand flag being configured to trigger display of a first on-demand identifier while the at least one of the linearly scheduled programs is being displayed;
    making the on-demand program available on an on-demand basis; and
    generating a program guide for display, the program guide summarizing at least a portion of the fixed linear programming schedule and including a second on-demand identifier identifying the at least one of the linearly scheduled video programs as corresponding with the on-demand program, the second on-demand identifier being generated according to a presence of the on-demand flag embedded in the at least one of the linearly scheduled video programs.

16. The method recited in claim 15 wherein making the on-demand program available on an on-demand basis comprises making the on-demand program available as part of a subscription that provides on-demand access to a plurality of subscription video programs, the on-demand program being a substantially identical counterpart to the at least one of the linearly scheduled video programs corresponding with the on-demand program.

17. The method recited in claim 15 wherein making the on-demand program available on an on-demand basis comprises providing options for selection of different versions of the on-demand program; and
    the program guide further includes a selection icon identified to correspond to a specific version among the different versions in accordance with a previously specified default selection of options.

18. The method recited in claim 15 wherein the first on-demand identifier is configured to be activated to initiate viewing of the on-demand program, the method further comprising:
    detecting activation of the first on-demand identifier; and
    in response to detecting the activation, transmitting the on-demand program.

19. A system for distributing programming, the system disposed at a content provider and comprising:
    a transmission system;
    a storage device in communication with the transmission system; and
    a communications device in communication with the transmission system,
    wherein the transmission system comprises a computer-readable storage medium having a computer-readable program embodied therein for directing operation of the transmission system, the computer-readable program comprising:
        instructions for generating a fixed linear programming schedule identifying an order of transmission for a plurality of linearly scheduled programs, at least one of the linearly scheduled programs corresponding with an on-demand program stored on the storage device;
        instructions for transmitting the programs over the communications device in the order of transmission;
        instructions for confirming an on-demand flag is embedded in the at least one of the linearly scheduled programs to identify the at least one of the linearly scheduled programs as corresponding with the on-demand program stored on the storage device, the embedded on-demand flag being configured to trigger display of a first on-demand identifier while the at least one of the linearly scheduled programs is being displayed;
        instructions for making the on-demand program offered by the content provider available on an on-demand basis; and
        instructions for generating a program guide for display, the program wide summarizing at least a portion of the fixed linear programming schedule and including a second on-demand identifier identifying the at least one of the linearly scheduled programs as corresponding with the on-demand program, the second on-demand identifier being generated according to a presence of the on-demand flag embedded in the at least one of the linearly scheduled programs.

20. The system recited in claim 19 wherein the instructions for making the on-demand program available on an on-demand basis comprise instructions for making the on-demand program available as part of a subscription that provides on-demand access to at least the on-demand program, the on-demand program being a substantially identical counterpart to the at least one of the linearly scheduled programs corresponding with the on-demand program.

21. The system recited in claim 19 wherein:
    the instructions for making the on-demand program available on an on-demand basis comprise instructions for making supplementary material related to the on-demand program available on an on-demand basis; and
    the program guide further identifies the supplemental material available.

22. The system recited in claim 19 wherein the first on-demand identifier is configured to be activated to initiate viewing of the on-demand program, the computer-readable medium further comprising:

instructions for detecting activation of the first on-demand identifier; and instructions for transmitting the on-demand program over the communications device in response to detecting the activation.

* * * * *

UNITED STATES PATENT AND TRADEMARK OFFICE
CERTIFICATE OF CORRECTION

| | | |
|---|---|---|
| PATENT NO. | : 8,020,186 B1 | Page 1 of 1 |
| APPLICATION NO. | : 11/076450 | |
| DATED | : September 13, 2011 | |
| INVENTOR(S) | : John J. Sie et al. | |

It is certified that error appears in the above-identified patent and that said Letters Patent is hereby corrected as shown below:

In the Claims:

Column 12, Claim 19, Line 44, please delete "wide" and insert --guide--.

Signed and Sealed this
Twenty-ninth Day of November, 2011

David J. Kappos
*Director of the United States Patent and Trademark Office*